Patented Mar. 23, 1926.

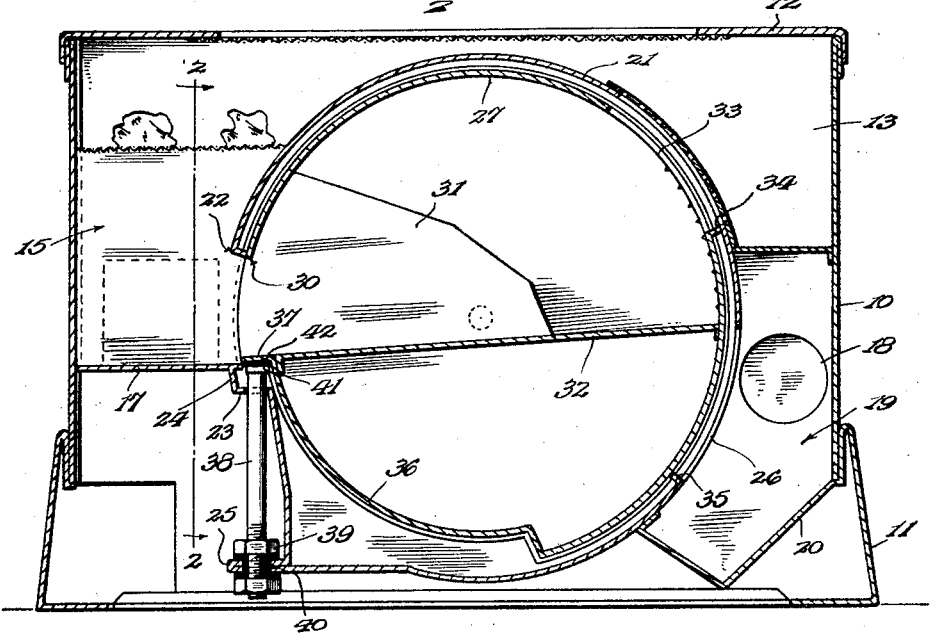

1,578,196

UNITED STATES PATENT OFFICE.

IRAD W. HILLS, OF STANLEY, WISCONSIN.

TRAP DRUM FOR ANIMAL TRAPS.

Application filed November 12, 1924. Serial No. 749,541.

*To all whom it may concern:*

Be it known that I, IRAD W. HILLS, a citizen of the United States, residing at Stanley, in the county of Chippewa and State of Wisconsin, have invented certain new and useful Improvements in Trap Drums for Animal Traps, of which the following is a specification.

This invention relates to an improved trap drum for animal traps, being especially designed to be incorporated in my improved animal trap as disclosed in Patent No. 1,486,663, granted to me March 11, 1924.

In accordance with this invention, a cylindrical shell is journaled at its ends and is provided with an internal transverse floor over which the animal to be caught will proceed until the animal crosses the pivotal center of the shell, when the weight of the animal will cause the shell to rotate and thereby effect trapping of the animal. As will be perceived, the effectiveness of the device will be largely determined by the suddenness of movement of the shell since, after the shell begins to turn, it is imperative that the turning movement thereof continue quickly so that the animal cannot recover balance and retreat. In the patented device, the drum is counter-weighted and while this arrangement is quite effective still, it is open to the objection that the drum will not be held perfectly still and rigid until the animal has progressed far enough beyond the pivotal center of the drum. The present invention, therefore, further comprehends the provision of means for thus holding the shell perfectly still and rigid until the animal to be caught has progressed a considerable distance beyond the pivotal center of the drum so that when the drum is overbalanced, it will be turned suddenly and quickly.

In the drawings:

Figure 1 is a transverse sectional view through a trap embodying the present invention, and Figure 2 is a fragmentary vertical sectional view on the line 2—2 of Figure 1, looking in the direction of the arrows.

Referring now more particularly to the drawings, I have shown the present improvements in conjunction with a trap of the construction shown in my patented device as previously identified and it is, therefore, unnecessary to enter into a description of all the details of the patented structure. However, to afford a better understanding of the present invention, I have shown the trap body at 10, said body being supported by a base frame 11 and provided with a cover 12. Extending transversely of the trap body are spaced partitions 13 in one of which is formed an entrance opening 14 at one end of a passageway 15 and dividing said passageway is a partition 16 rising from the floor 17 of the passageway, it being observed that animals may also enter the passageway 15 at the end thereof opposite the opening 14. As shown in Figure 1 of the drawings, said partition is also provided with an opening 18 at one end of a passageway 19 located at the side of the trap body opposite the passageway 15, the opening 18 connecting the passageway 19 with a cage at the adjacent end of the trap body. The floor of the passageway 19 is indicated at 20.

Coming now more particularly to the subject of the present invention, I employ a substantially cylindrical casing 21 detachably secured at its ends to the partitions 13 to extend horizontally within the trap body between the passageways 15 and 19. At its forward side the casing is formed with an entrance opening 22 divided by the partition 16 and at the lower edge of said opening the wall of the casing is formed with an offset 23 from which extends a flange 24 supporting the floor 17 at its forward margin. Below the offset 23, the wall of the casing is bent to define angularly disposed portions overlapped to form a flange 25 lying in spaced parallel relation to said offset while at the side of the casing opposite the entrance opening 22, the casing is provided with an exit opening 26 at the passageway 19. Rotatably mounted in the casing is a cylindrical drum shell 27 having end walls 28 and mounted upon the partitions 13 to coact with said end walls axially of the shell are trunnions 29 journaling the shell. At its forward side, the shell is provided with an entrance opening 30 adapted to register with the entrance opening 22 of the casing and dividing the entrance opening 30 is a partition 31 alining with the partition 16. Extending transversely within the shell from the lower edge of the entrance opening 30 is a floor 32 upon which the partition 31 is mounted and, as will be observed, the floor is disposed below the axis of the shell. Formed in the shell at its rear side and spaced above the floor is an exit opening 33 adapted to register with the exit opening 26 of the casing and formed on the shell at the lower edge of the opening 33 is a stop flange 34 disposed to strike a stop flange 35 projecting inwardly from the casing at the lower edge of the opening 26 for limiting the shell in its movement in clockwise direction.

Below the entrance opening 30 of the shell, the wall of the shell is indented, as indicated at 36, and is bent to define a laterally directed flange 37 at the lower edge of said opening, this flange lying, however, within the major radius of the shell, and mounted upon the flange 25 of the casing to upstand therefrom beneath the flange 37 is a fixed magnet 38. As suggested in the drawings, the magnet 38 may be in the nature of a cylindrical rod and screwed upon the lower end of said rod to confront opposite sides of the flange 25 are nuts 39 rigidly mounting the rod and which may be adjusted for varying the effective height of the rod. In the drawings, I have shown the use of a suitable insulating bushing 40 for the rod. The offset 23 of the casing is apertured to freely receive the magnet therethrough and mounted upon the flange 37 of the shell 27 is an armature 41 to cooperate with the magnet. In the drawings, I have also shown the armature insulated from the flange 37 by a suitable insulating disc 42.

As will now be seen in view of the foregoing description, the magnet 38 will normally hold the armature 41 thereagainst so that under ordinary circumstances, the shell 27 will be firmly retained at rest. Animals may accordingly enter the shell through the registering openings 22 and 30 to proceed across the floor 32 of the shell. In practice, the magnetic strength of the magnet 38 will be such that the magnet will, even though an animal proceeds slightly beyond the pivotal center of the shell, nevertheless, still hold the shell at rest, so that teetering or slight oscillation of the shell will be avoided. Accordingly, the shell will be held perfectly still until the animal has reached a point upon the floor 32 well beyond the pivotal axis of the shell so that when the weight of the animal finally overcomes the attractive force of the magnet, the weight of the animal will serve to suddenly release and quickly rotate the shell in a clockwise direction until the exit opening 33 of the shell is brought into register with the exit opening 26 of the casing. These registering openings being the only outlet then available, the animal will proceed into the passageway 19 to enter the cage of the trap through the opening 18. When the animal thus leaves the drum, the weight of the partition 31 in conjunction with what influence the magnet 38 may exert on the armature 41, will serve to return or counterrotate the shell to its original position for again setting the trap.

Having thus described the invention, what I claim is:

1. In an animal trap, a casing having a substantially cylindrical chamber formed therein and provided with circumferentially spaced inlet and outlet passages, an inwardly extending flange being provided below the bottom of said inlet and a support below said flange, a magnet carried by said support and extending upwardly through said flange, a hollow drum rotatably mounted in said chamber and having inlet and outlet openings spaced to alternately register with the inlet and outlet passages of the chamber as the drum is oscillated in said chamber, a lip at the lower edge of the inlet of said drum disposed over said flange, an armature for said magnet carried by said lip, and a flooring in said drum extending between said lip and the outlet of the drum.

2. In an animal trap, a casing having a substantially cylindrical chamber formed therein and provided with circumferentially spaced inlet and outlet passages, an inwardly extending flange being provided below the bottom of said inlet, a magnet projecting upwardly from said flange, a hollow drum in said chamber formed with circumferentially spaced inlet and outlet openings, said drum being mounted for oscillating movement to alternately bring its inlet and outlet openings into registry with the cooperating inlet and outlet passages of said chamber, the annular wall of said drum being offset to form a ledge at the lower edge of its inlet opening, an armature carried by said ledge above said magnet and when engaged therewith holding the drum in a set position with its inlet registering with the inlet of the chamber, and a flooring in said drum between its inlet and outlet.

In testimony whereof I affix my signature.

IRAD W. HILLS. [L. S.]